J. P. TOLMAN & J. L. BIXBY, Jr.
ROPE FOR THE TRANSMISSION OF POWER.
APPLICATION FILED AUG. 10, 1908.
974,843.
Patented Nov. 8, 1910.
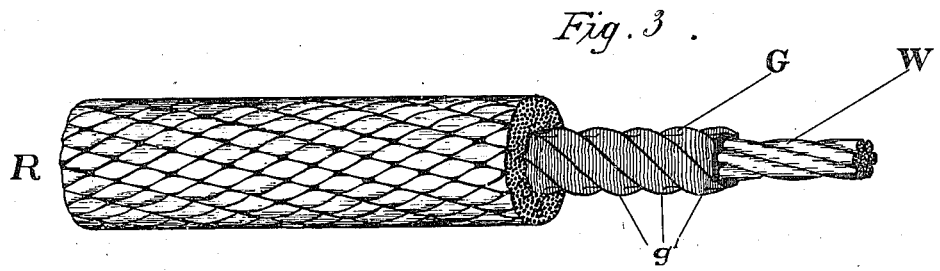
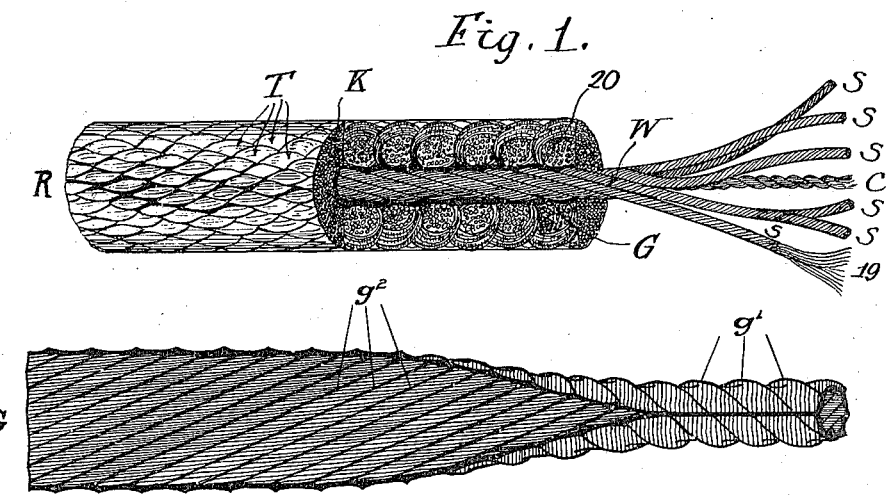
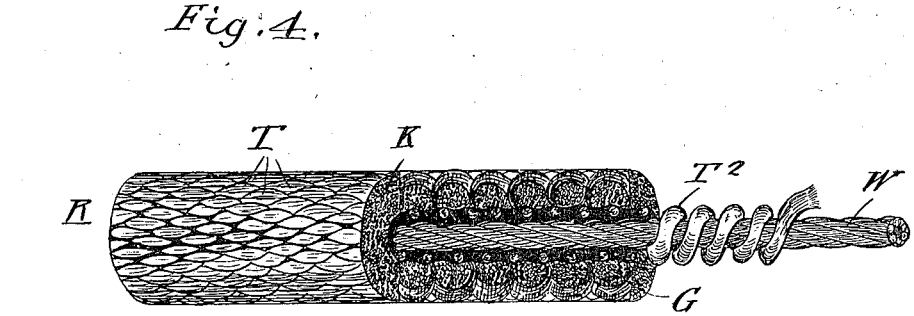
WITNESSES:
INVENTORS
BY
ATTORNEYS

UNITED STATES PATENT OFFICE.

JAMES P. TOLMAN, OF NEWTON, AND JOHN LEWIS BIXBY, JR., OF ARLINGTON, MASSACHUSETTS, ASSIGNORS TO SAMSON CORDAGE WORKS, OF BOSTON, MASSACHUSETTS, A CORPORATION OF MASSACHUSETTS.

ROPE FOR THE TRANSMISSION OF POWER.

974,843.     Specification of Letters Patent.     Patented Nov. 8, 1910.

Application filed August 10, 1908. Serial No. 447,725.

*To all whom it may concern:*

Be it known that we, JAMES P. TOLMAN, of Newton, in the county of Middlesex and State of Massachusetts, and JOHN LEWIS BIXBY, Jr., of Arlington, in the county and State aforesaid, both citizens of the United States, have invented a new and useful Improvement in Ropes for the Transmission of Power, of which the following is a specification.

Power transmission ropes are designed for running over grooved pulleys or sheaves and are usually made from fibrous strands, from metallic wire strands, or from a combination of the two. When fibrous strands only are used the ropes quickly stretch and require shortening and resplicing, or if this is to be avoided, one or more take-up pulleys in traveling carriages must be installed in each system to care for the slack rope. The fibrous ropes are so easily extensible under load that they cannot be used for the transmission of as much power as their holding surface in the grooves would permit. On the other hand, wire ropes while offering the advantage of comparative inextensibility under considerable loads, do not afford a good holding surface in the grooves, and are more difficult to splice.

Combination ropes comprising a union of fibrous and metallic wire strands, as heretofore made, have had the individual wire strands wound or surrounded by the fibrous strands. When a strain is put upon such a rope the amount of fiber in the center of the rope is sufficient to permit stretching, and the amount of fiber outside of the wires is insufficient to prevent their cutting through and coming into contact with the sheaves, so that they are broken and the rope becomes worthless. Combination ropes have also been made in which a wire core has been surrounded by a fibrous covering, but in this case the fibrous covering stretches in use and in stretching crawls upon the non-stretchable wire core, thus making a rope which varies in diameter and runs irregularly and wears unevenly.

Our invention consists in a transmission rope which is made of both fibrous strands and metallic wire strands united by a matrix of cementitious material into which both are embedded and which has been vulcanized to form a tough bond to hold the core and covering from relative movement. The wire strands or wires are placed near the axial line of the rope, thus obtaining practical inextensibility. The fibrous strands are placed on the exterior or peripheral portion of the rope in order to provide a necessary bearing surface upon the pulleys and also to protect the pulleys which are often constructed of wood, from the wear which the constant abrasion by metal surfaces would cause them. Between the two layers is a layer of cementitious material preferably an india rubber compound, which layer of cementitious material penetrates between the wires and takes their form upon its inner side and penetrates into the fibrous covering upon its outer side, and is vulcanized forming a matrix which by its penetration into the exposed surfaces within it and about it clings to both, and by its toughness holds the outer layer and the core together so that neither can move longitudinally with relation to the other, thus making the rope as a whole to all intents and purposes a single entity instead of a series of layers, which entity has those features required in a rope of this class and which so far as we have been able to determine have never before been reached.

Our invention may be varied in character by serving the wire rope with a spiral winding of twine with which as well as with the other parts of the rope the matrix interlocks.

Our invention is equally applicable whether the fibrous exterior is braided or laid.

Our invention will be understood by reference to the drawings in which—

Figure 1 shows a rope embodying our invention, a portion being in section. Fig. 2 is a similar view showing a slight modification. Fig. 3 shows a portion of such a rope as is shown in Fig. 1 from which a portion of the fibrous covering has been removed to expose the cementitious layer, a portion of the cementitious layer being also removed to disclose the core. Fig. 4 is a piece of the cementitious layer which has been removed after vulcanizing and opened out to disclose the impression which the core has made upon it.

As shown in Figs. 1 and 3, our invention comprises a core as at W, a cementitious layer G and a fibrous exterior R. The core W is preferably constructed of a center C which is fibrous, which may be made as shown in Fig. 1 of two fibrous strands laid together, and around this center is laid a number of strands S (in the drawings six are shown), each strand consisting of a plurality of metallic wires 19 laid in the ordinary way. This is a convenient way of making a core though any other form of non-stretchable metallic core may be used. In Figs. 1, 2 and 3 the fibrous exterior R comprises a number of strands (in the drawing 28 strands are shown), which are braided together. We prefer that the exterior should be braided, but this is not essential. The important feature of this rope, however, lies in the cementitious layer marked G in the drawing, which is preferably of india rubber, india rubber compound or the like which is applied to the core before the adding of the fibrous exterior in such quantity as is sufficient not only to form of itself a layer between the core and the exterior covering but during the application of the exterior covering by the braiding machine or otherwise to be squeezed into an interlocking relation with both the core and the cover as shown especially in Figs. 3 and 4, and to serve after vulcanization as a bond between the core and the fibrous exterior, thus preventing the travel of the fibrous exterior upon the core. After the fibrous exterior has been applied about the matrix and core the rope is vulcanized so as to give to the cementitious compound the necessary toughness to enable it to fulfil its work as well as to cause it to cling to both the outer surface of the core and the inner surface of the fibrous exterior. Without toughness this bonding layer would be worthless, nor should it allow any movement of the fibrous exterior with relation to the core.

We have shown in Fig. 2 a construction in which in addition to the three elements, the core, the matrix and the fibrous exterior, there is wound upon the core a twine $T^2$ between the spirals of which the matrix acquires contact with the core and also with the fibrous exterior so that it performs the same function in this case as in the construction shown in Fig. 1, but an additional construction is added between the core and the fibrous exterior to prevent the travel of the one with relation to the other.

It will be noted that a rope constructed according to our invention has features not found in any prior rope so far as we are aware in that it has the non-stretchable quality due to its wire core combined with the clinging quality due to the fibrous exterior which enables the rope to take hold of the sheave over which it runs without slipping. The cement or cementitious material which lies between the two forms a tough bonding matrix, by which we mean that in quantity it is sufficient to form of itself a tough layer between the core and the fibrous exterior, which is squeezed into interlocking relation with both the core and the fibrous exterior during the process of applying the exterior to the core. When this process of applying the fibrous exterior is finished the rope is then submitted to sufficient heat to secure the proper vulcanization of the cementitious compound or material which changes its character from a penetrating pasty mass without strength to a tough matrix having sufficient strength to prevent the longitudinal movement of the core and exterior of the rope with relation to each other.

In using the term "cement" or "cemented" in this specification we mean to imply the making of a tough vulcanized matrix of cementitious material and not the mere sticking together of the core and covering as might result in causing the adhesion of the core to the outer surface at different points along their length. As will be seen from Figs. 3 and 4 the character of the cementitious material used by us is such that it takes hold upon both the core and the exterior in such a way that there are ridges upon the outer and inner surfaces of the cement matrix. This embedding of the cement into the two different materials forms after vulcanization a union that could not be accomplished merely by adhesion as the adhesive effect would soon become ruptured by the bending of the rope while in use and hence the rope would soon become worthless because of its lack of adhesion and the consequent crawling or traveling of the stretchable fibrous exterior upon the core.

We do not mean to limit ourselves in any way to the details of construction of the core so long as it is non-stretchable, nor to the construction of the exterior so long as it is fibrous and braided or otherwise applied in any convenient way and with any convenient number of strands, to the cementitious layer which being afterward vulcanized grips it and holds it to the core, our invention comprising a transmission rope containing a wire core and a fibrous exterior of one or more layers where the core and exterior are maintained in anti-creeping relation to each other by means of vulcanized cementitious material having a thickness and character which enables it to interlock on both its inner surface with the outer surface of the core and on its outer surface with the inner surface of the fibrous covering and is vulcanized or otherwise toughened after the rope is made up so as to bond the core with the fibrous exterior so as to prevent longitudinal movement the one with the other.

While transmission ropes may have been made with a wire exterior they are worthless for reasons above given, and if embedded in a soft rubber intermediate layer the rope is equally worthless for transmitting purposes as such a layer allows a movement of the exterior layer or core which soon loosens the cover from the core and the rope becomes worthless. In our rope the bonding of the outer layer and core binds the two together so as to make a structure in which while each layer performs its own part in the use of the rope, the rope itself is practically a single entity of what might be called homogeneous character.

What we claim as our invention is:

A rope for the transmission of power comprising a central non-stretchable core containing metallic strands, a matrix of cementitious material surrounding said core, and an exterior covering of fibrous strands, said matrix penetrating the interstices of both the central core and the fibrous exterior and being vulcanized to form a tough bond between them uniting the two to prevent their longitudinal movement with relation to each other.

JAMES P. TOLMAN.
JOHN LEWIS BIXBY, Jr.

Witnesses:
ROYAL G. WHITING,
ETHEL L. CHANDLER.